H. Armstrong,
Forming Horseshoe Calks,

№ 55,220.          Patented June 5, 1866.

Witnesses:           Inventor:

UNITED STATES PATENT OFFICE.

HARRISON ARMSTRONG, OF SPARTA, WISCONSIN.

IMPROVEMENT IN HORSESHOES.

Specification forming part of Letters Patent No. 55,220, dated June 5, 1866.

*To all whom it may concern:*

Be it known that I, HARRISON ARMSTRONG, of Sparta, in the county of Monroe and State of Wisconsin, have invented a new and useful Improvement in Horseshoes; and I do hereby declare that the following is a full, clear, and exact description thereof, which will enable others skilled in the art to make and use the same, reference being had to the accompanying drawings, forming part of this specification, in which—

Figure 1:
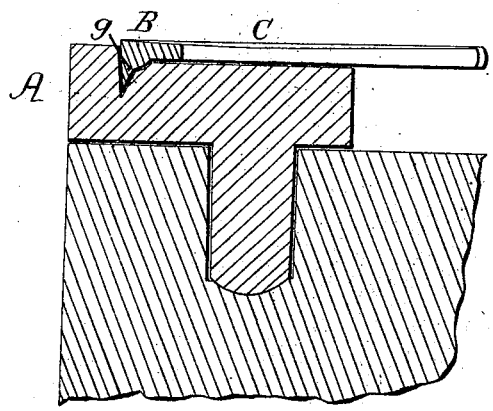
Figure 3:
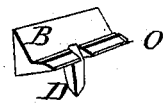
Figure 4:
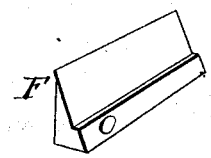
Figure 2:
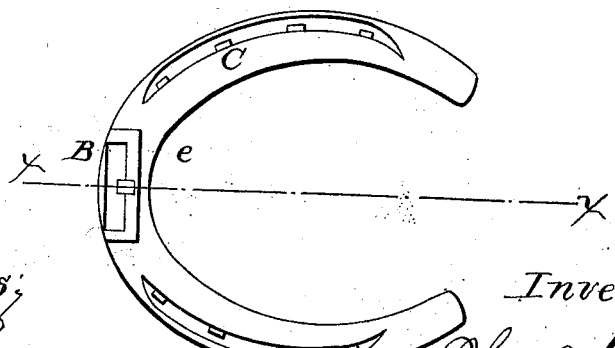

Figure 1 is a sectional elevation, taken on the line $x$ of Fig. 2, of a horseshoe made according to my invention and of the swage used in the process. Fig. 2 is a plan of a horseshoe. Fig. 3 is a detailed view of a calk ready to be welded onto a shoe. Fig. 4 is a short piece of a steel bar made according to my invention for forming toe-calks for horseshoes.

The invention consists in an improved method of making toe-calks for horseshoes.

The calks are prepared in blank by rolling out a bar of steel into proper form, with one edge sharp and with a ledge on the angular side of the bar. The bar is divided into sections or divisions, each of which is to be of a suitable length for a toe-calk. A spur is formed on the base thereof by driving a portion of the ledge downward. This spur is to be let into a depression made for it in the shoe. When the shoe and the calk are heated they are placed together in a swage of the proper form to weld the calk and leave it sharp.

The material for the toe-calk is prepared in bars of any suitable length, consisting of steel bars rolled out to the shape seen in Fig. 4, which is a short piece of such a bar. It has two sides straight and at right angles to each other—to wit, that which answers to the outside of the calk and that which answers to its bottom, which comes next to the shoes. The inner side is angular from the top, which is left sharp, down to a ledge or base, $o$, which extends all along the bar, and which itself declines at an angle until it reaches its lower edge.

The bar F (seen in Fig. 4) is divided into sections of a suitable length for toe-calks, and a spur, D, is punched down from the ledge O at the middle of its length, as seen in Fig. 3, where B designates a section of the bar F of suitable length for the toe-calk of a horseshoe. The shoe C has a depression made in it at a suitable place to receive the spur D, so that the two can be fitted together for welding. When the toe-calk B and the shoe are heated they are fitted together by means of the spur D, and are then placed in the swage A and welded.

The spur in the center of the calk does not weaken or disfigure the shoe, as is done by the present mode of welding and sharpening calks.

It will be observed that by my process the calks are not required to be sharpened up after welding, and that in the act of welding a ledge or base is formed along the inner line and ends of the cork, where it and the shoe are joined to each other.

I claim as new and desire to secure by Letters Patent—

Forming a spur on the calk by driving a portion of the ledge downward, substantially as and for the purpose described.

HARRISON ARMSTRONG.

Witnesses:
M. A. THAYER,
S. B. HAMILTON.